US012399705B2

(12) United States Patent
Paini et al.

(10) Patent No.: US 12,399,705 B2
(45) Date of Patent: \*Aug. 26, 2025

(54) SCHEDULING A PAUSABLE AUTOMATED PROCESS IN A COMPUTER NETWORK

(71) Applicant: Bank of America Corporation, Charlotte, NC (US)

(72) Inventors: Siva Kumar Paini, Hyderabad (IN); Sudhakar Balu, Chennai (IN); Sathya Thamilarasan, Theni (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,419

(22) Filed: Jan. 10, 2024

(65) Prior Publication Data

US 2024/0143307 A1   May 2, 2024

Related U.S. Application Data

(63) Continuation of application No. 17/688,665, filed on Mar. 7, 2022, now Pat. No. 11,922,161.

(51) Int. Cl.
*G06F 9/44*   (2018.01)
*G06F 8/65*   (2018.01)

(52) U.S. Cl.
CPC ...................... *G06F 8/65* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 3,286,239 A | 11/1966 | Thompson et al. |
| 3,312,951 A | 4/1967 | Hertz |
| 3,333,252 A | 7/1967 | Shimabukuro |
| 3,359,544 A | 12/1967 | Macon et al. |
| 3,363,234 A | 1/1968 | Erickson et al. |
| 3,399,384 A | 8/1968 | Crockett et al. |
| 3,421,150 A | 1/1969 | Quosig et al. |
| 3,449,722 A | 6/1969 | Tucker |
| 3,491,339 A | 1/1970 | Schramel et al. |
| 3,496,551 A | 2/1970 | Driscoll et al. |
| 3,530,438 A | 9/1970 | Mellen et al. |

(Continued)

FOREIGN PATENT DOCUMENTS

| | | |
|---|---|---|
| GB | 2194086 A | 2/1988 |
| GB | 2367913 A | 4/2002 |

OTHER PUBLICATIONS

Paini, S. K. et al., "Automated Process Scheduling in a Computer Network," U.S. Appl. No. 17/688,549, Mar. 7, 2022, 35 pages.

(Continued)

*Primary Examiner* — Hang Pan (57) ABSTRACT

A device configured to identify automated process instructions for a network device. The automated process instructions include instructions for performing a series of actions on the network device. The device is further configured to identify a first time instance for executing the automated process instructions that does not occur within a time interval associated with a first system update for the network device and to execute the machine-executable code at the first time instance to perform the series of actions on the network device.

11 Claims, 4 Drawing Sheets

(56) References Cited

U.S. PATENT DOCUMENTS

| | | | |
|---|---|---|---|
| 3,648,253 | A | 3/1972 | Mullery et al. |
| 4,047,161 | A | 9/1977 | Davis |
| 4,073,005 | A | 2/1978 | Parkin |
| 4,096,564 | A | 6/1978 | Inose et al. |
| 4,099,235 | A | 7/1978 | Hoschler et al. |
| 4,318,173 | A | 3/1982 | Freedman et al. |
| 4,325,120 | A | 4/1982 | Colley et al. |
| 4,333,144 | A | 6/1982 | Whiteside et al. |
| 4,369,494 | A | 1/1983 | Bienvenu et al. |
| 4,394,727 | A | 7/1983 | Hoffman et al. |
| 4,852,001 | A | 7/1989 | Tsushima et al. |
| 4,954,948 | A | 9/1990 | Hira et al. |
| 5,093,794 | A | 3/1992 | Howie et al. |
| 5,210,872 | A | 5/1993 | Ferguson et al. |
| 5,233,533 | A | 8/1993 | Edstrom et al. |
| 5,361,362 | A | 11/1994 | Benkeser et al. |
| 5,437,032 | A | 7/1995 | Wolf et al. |
| 5,499,370 | A | 3/1996 | Hosaka et al. |
| 5,619,695 | A | 4/1997 | Arbabi et al. |
| 5,826,236 | A | 10/1998 | Narimatsu et al. |
| 6,014,760 | A | 1/2000 | Silva et al. |
| 6,085,218 | A | 7/2000 | Carmon |
| 6,408,277 | B1 | 6/2002 | Nelken |
| 6,490,612 | B1 | 12/2002 | Jones et al. |
| 6,567,840 | B1 | 5/2003 | Binns et al. |
| 11,400,823 | B1 * | 8/2022 | Sampath .................. B60L 58/12 |
| 2003/0171826 | A1 | 9/2003 | Lee |
| 2004/0015973 | A1 | 1/2004 | Skovira |
| 2009/0006884 | A1 * | 1/2009 | Cahill .................. H04L 41/0663 709/206 |
| 2013/0074041 | A1 * | 3/2013 | Bates .................. G06F 11/3632 717/124 |

OTHER PUBLICATIONS

Paini, S. K. et al., "Automated Process and System Update Scheduling in a Computer Network," U.S. Appl. No. 17/688,619, Mar. 7, 2022, 38 pages.

* cited by examiner

SCHEDULING A PAUSABLE AUTOMATED PROCESS IN A COMPUTER NETWORK

CROSS-REFERENCE TO RELATED APPLICATION

The application is a continuation of U.S. patent application Ser. No. 17/688,665, filed Mar. 7, 2022, entitled "SCHEDULING A PAUSABLE AUTOMATED PROCESS IN A COMPUTER NETWORK," which is incorporated herein by reference.

TECHNICAL FIELD

The present disclosure relates generally to process management for a computer network, and more specifically to scheduling a pausable automated process in a computer network.

BACKGROUND

In a computer system, network devices are tasked with performing multiple tasks such as data processing and transferring data to other network devices. Periodically, network devices will perform system updates to update the system, network, and/or security settings of the network devices. These system updates cause an interruption that consumes the available hardware resources of a network device and creates a bottleneck that causes other processes on the network device to slow down or even fail. In some instances, a system update may force a system reboot which may also cause processes on the network device to slow down or fail. These issues associated with the overconsumption of available hardware resources degrade the performance and throughput of the network device and the computer system.

SUMMARY

The disclosed system provides several practical applications and technical advantages that overcome the previously discussed technical problems. The following disclosure provides a practical application of a process control device for a computer system. The disclosed process control device provides practical applications that improve the resource utilization of network devices and the computer system by scheduling processes (e.g. automated processes) in conjunction with system updates for a network device. This process generally involves forecasting or predicting when a system update may occur on a network device and then scheduling an automated process on the network device based on when the system update is predicted to occur. The disclosed process control device provides a technical improvement by scheduling automated processes and system updates to avoid overconsumption of available hardware resources for a network device. This process allows the process control device to load balance the network devices in the computer system to provide improved hardware utilization for the network devices. Improving the hardware utilization for a network device allows the network device to perform system updates without negatively affecting other processes that are being performed on the network device. By improving the hardware utilization for the network devices in the computer system, the process control device is also able to improve the overall hardware utilization for the computer system. Thus, this process provides improved load balancing and resource utilization that improves the throughput and overall performance of network devices and the computer system.

In one embodiment, the computer system comprises a process control device that is configured to identify automated process instructions for a network device. The automated process instructions include instructions for performing a series of actions on the network device. The instructions include machine-executable code partitioned into a plurality of code segments using breakpoints where each breakpoint temporarily pauses the execution of the machine-executable code between a pair of code segments. The device is further configured to identify a first time instance for executing the automated process instructions that does not occur within a time interval associated with a system update for the network device and to execute the machine-executable code at the first time instance to perform the series of actions on the network device.

In another embodiment, the computer system comprises a process control device that is configured to identify automated process instructions for a first network device. The automated process instructions include instructions for performing a series of actions on the first network device. The device is further configured to identify a first time instance for executing the automated process instructions that is before a time interval associated with a system update for the first network device, to identify a second time instance corresponding with a start time of the time interval associated with the system update for the first network device, and to identify a third time instance corresponding with an end time of the time interval associated with the system update for the first network device. The device is further configured to execute the machine-executable code at the first time instance, to pause the execution of the machine-executable code at a breakpoint at the second time instance, and to resume execution of the machine-executable code after the breakpoint at the third time instance after the system update is complete.

In another embodiment, the computer system comprises a process control device that is configured to identify automated process instructions for a network device. The automated process instructions include instructions for performing a series of actions on the network device. The device is further configured to identify a first time instance for executing the automated process instructions that does not occur within a time interval associated with a first system update for the network device and to execute the machine-executable code at the first time instance to perform the series of actions on the network device. The device is further configured to detect a second system update for the network device while executing the machine-executable code, to pause the execution of the machine-executable code at a breakpoint at a second time instance after detecting the second system update, and to resume execution of the machine-executable code after the breakpoint at a third time instance after the second system update is complete.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Computer System Overview

Figure 1:
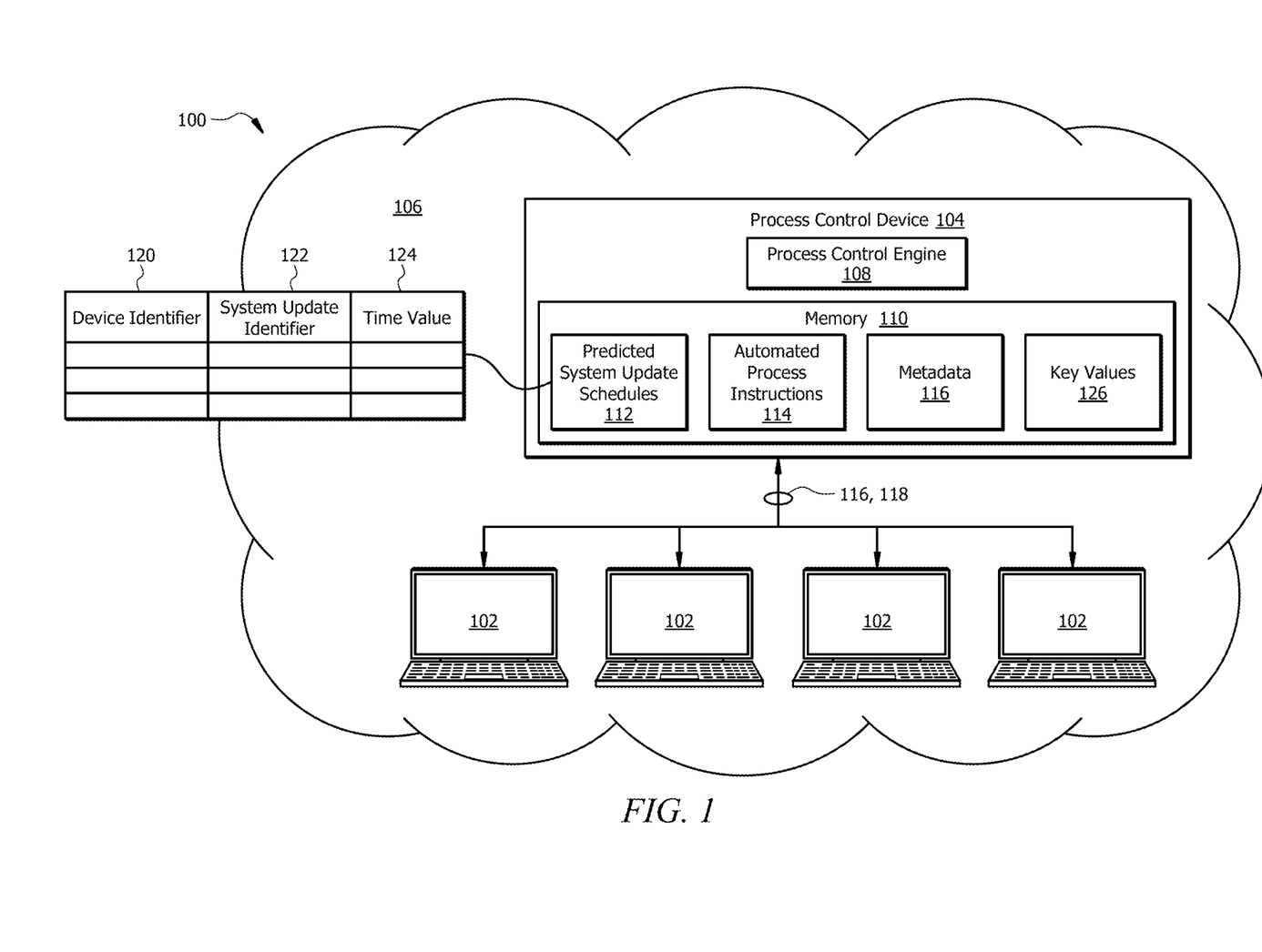
FIG. 1 is a schematic diagram for a computer system configured to use a process control device.

FIG. 1 is a schematic diagram of an embodiment of a computer system 100 that is generally configured to improve the resource utilization of the computer system 100 by scheduling processes (e.g. automated processes) in conjunction with system updates for a network device 102. The computer system 100 is generally configured to employ a process control device 104 that forecasts or predicts when a system update may occur on a network device 102 and then schedules an automated process on the network device 102 based on when the system update is predicted to occur. In some instances, the process control device 104 may schedule an automated process to be performed before or after a system update is predicted to occur. In other instances, the process control device 104 may co-schedule automated processes with system updates. In this case, the process control device 104 executes an automated process until the time that a system update is predicted to occur. The process control device 104 will then pause the automated process and resume the automated process once the system update has been completed. In some instances, the process control device 104 may monitor for unexpected system updates when executing an automated process. In this case, the process control device 104 pauses the automated process in response to detecting an unexpected system update and resumes the automated process once the system update has been completed. The process control device 104 provides a technical improvement by scheduling automated processes and system updates to avoid overconsumption of available hardware resources for a network device 102. This process allows the process control device 104 to load balance the network devices 102 in the computer system 100 to provide improved hardware utilization for the network devices 102. Improving the hardware utilization for a network device 102 allows the network device 102 to perform system updates without negatively affecting other processes that are being performed on the network device 102. By improving the hardware utilization for the network devices 102 in the computer system 100, the process control device 104 is also able to improve the overall hardware utilization for the computer system 100.

In one embodiment, the computer system 100 comprises one or more network devices 102 and a process control device 104. The network devices 102 and the process control device 104 are in signal communication with each other within a network 106. The network 106 allows communication between and amongst the various components of the computer system 100. This disclosure contemplates the network 106 being any suitable network operable to facilitate communication between the components of the computer system 100. The network 106 may include any interconnecting system capable of transmitting audio, video, signals, data, messages, or any combination of the preceding. The network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network Devices

A network device 102 is a hardware device that is generally configured to provide hardware and software resources to a user. Examples of a network device 102 include, but are not limited to, a laptop, a computer, a smartphone, a tablet, a smart device, or any other suitable type of device. The network device 102 may comprise a graphical user interface (e.g. a display), a touchscreen, a touchpad, keys, buttons, a mouse, or any other suitable type of hardware that allows a user to view data and/or to provide inputs into the network device 102. Periodically, a network device 102 is configured to perform a system update that modifies one or more settings on the network device 102. Examples of a system update include, but are not limited to, an application update, an operating system update, a software update, a firmware update, a network configuration update, a security update or patch, or any other suitable type of update.

Process Control Device

Examples of a process control device 104 include, but are not limited to, a server, an access point, a computer, or any other suitable type of network device. In one embodiment, a process control device 104 comprises a process control engine 108 and a memory 110. Additional details about the hardware configuration of the process control device 104 are described in FIG. 4. The memory 110 is configured to store predicted system update schedules 112, automated process instructions 114, metadata 116, key values 126, and/or any other suitable type of data.

In one embodiment, the process control engine 108 is generally configured to generate a predicted system update schedule 112 for a network device 102 based on metadata 116 that is associated with previous system updates for the network device 102. An example of the process control engine 108 performing this operation is described in more detail in FIG. 2. The predicted system update schedule 112 comprises information associated with system updates that are forecasted or predicted to be performed on a network device 102. For example, a predicted system update schedule 112 may comprise device identifiers 120, system update identifiers 122, and time values 124. The device identifier 120 uniquely identifies a network device 102. Examples of device identifiers 120 include, but are not limited to, a Media Access Control (MAC) address, an Internet Protocol (IP) address, an alphanumeric identifier or code, or any other suitable type of identifier that can be used to identify a network device 102 within the computer system 100. The system update identifier 122 identifies a system update or a type of system update that will be performed on a network device 102. The system update identifier 122 may be a name, an alphanumeric code, or any other suitable type of identifier. The time value 124 identifies a time interval when a system update is forecasted to be performed on a network device 102. For example, the time value 124 may comprise a first timestamp (e.g. a day and/or time) for when a system update is predicted to start. The time value 124 may further comprise a second timestamp for when the system update is expected to be completed. The process control engine 108 is configured to use the time value 124 for scheduling automated processes on a network device 102. In other examples, a predicted system update schedule 112 may comprise any other suitable type or combination of information that is associated with a network device 102 and/or a system update.

The process control engine 108 is further configured to schedule automated processes on a network device 102. An automated process generally comprises a series of actions that are to be performed on or by a network device 102. In one embodiment. the process control engine 108 is configured to schedule automated processes around any predicted system updates. In this case, the process control engine 108 identifies a time to perform an automated process such that the automated process can be performed without being interrupted by a system update. In another embodiment, the process control engine 108 is configured to co-schedule an automated process with a system update. In this case, the process control engine 108 schedules the automated process such that the automated process can be temporarily paused to allow a forecasted system update to be completed. After the system update has been completed, the process control engine 108 then resumes the automated process so that it can also be completed. In another embodiment, the process control engine 108 is configured to detect when an unexpected system update has begun after initiating an automated process. In this case, the process control engine 108 pauses the automated process in response to detecting the system update. After the system update has been completed, the process control engine 108 then resumes the automated process. Examples of the process control engine 108 performing these operations are described in more detail in FIG. 3.

The automated process instructions 114 generally comprises machine-executable code for performing a series of actions on a network device 102. Examples of the machine-executable code include, but are not limited to, scripts, source code, macro, executable files, or any other suitable type of code that can be executed on a network device 102. In one embodiment, the machine-executable code is partitioned into a plurality of code segments using breakpoints. Each breakpoint corresponds with a logical breakpoint between two code segments. A breakpoint may also correspond with a location in the code where the execution of the code can be temporarily paused to allow other operations (e.g. a system update) to be performed. In this case, the code will resume execution at the code segment that immediately follows the breakpoint.

System Update Schedule Prediction Process

Figure 2:
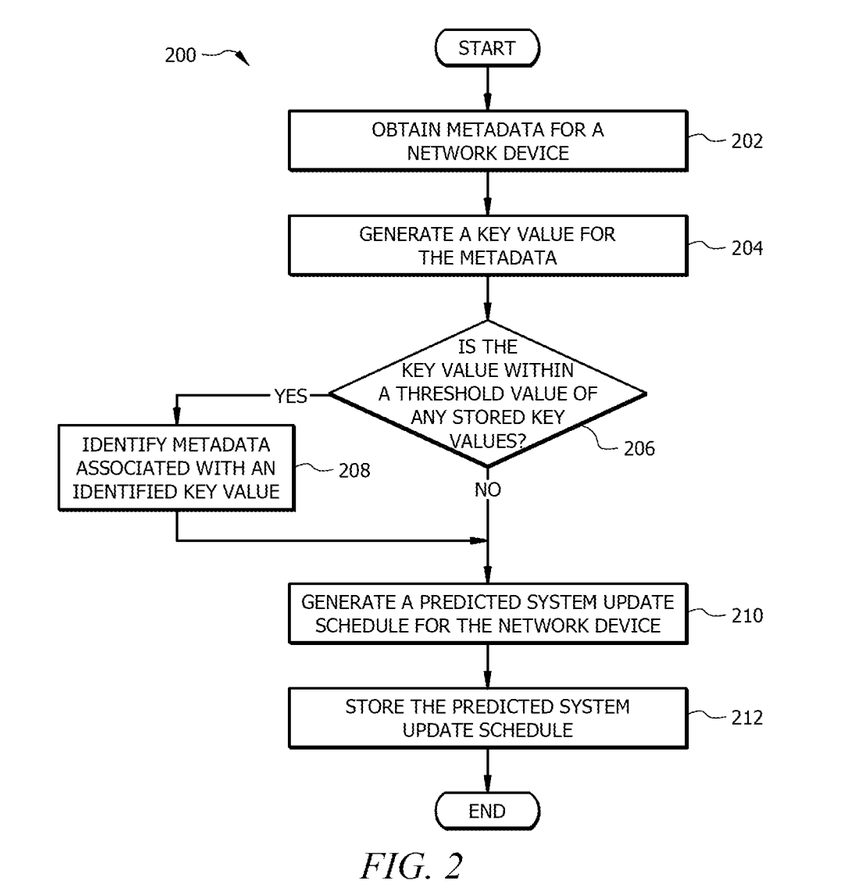
FIG. 2 is a flowchart of an embodiment of a system update schedule prediction process for the computer system.

FIG. 2 is a flowchart of an embodiment of system update schedule prediction process 200. The computer system 100 may employ process 200 to generate a predicted system update schedule 112 for a network device 102 based on metadata 116 that is captured from the network device 102.

At operation 202, the process control device 104 obtains metadata 116 for a network device 102. In some embodiments, the process control device 104 may be configured to periodically receive metadata 116 for the network device 102. For example, the process control device 104 may receive metadata 116 from the network device 102 daily, weekly, monthly, or at any other suitable time interval. In other embodiments, the process control device 104 may be configured to receive metadata 116 for the network device 102 in response to a request for the metadata 116. The metadata 116 generally comprises information about any activities or operations that are performed on the network device 102. The metadata 116 may comprise timestamps that are associated with one or more system updates that were previously performed on the network device 102, an execution time that is associated with one or more system updates, log files, or any other suitable type of metadata that is associated with the network device 102 and/or system updates that were performed on the network device 102. In some embodiments, the process control device 104 may be configured to determine the execution time using a screen capture recording (e.g. a video capture recording) of the operations executing on the network device 102. For example, the metadata 116 may comprise a screen capture recording of a system update being performed on the network device 102. In this example, the process control device 104 may identify a first timestamp that corresponds with when a system update begins and a second timestamp that corresponds with when the system update has completed. The process control device 104 may then use timestamps to determine an execution time for the system update based on a difference between the timestamps. In other examples, the process control device 104 may determine an execution time using log files or any other suitable technique.

At operation 204, the process control device 104 generates a key value 126 for the metadata 116. The key value 126 is a value that is uniquely associated with the data content of the metadata 116. As an example, the process control device 104 may determine the key value 126 by performing a hashing operation on the metadata 116 to generate a hash value. In this example, the generated hash value is uniquely associated with the content of the metadata 116. By generating a key value 126, the process control device 104 can determine whether there is any similar metadata 116 that is associated with other network devices 102. In this case, the difference between two key values 126 (e.g. hash values) indicates a level of similarity between the metadata 116 that is associated with the key value 126. Key values 126 with similar values are associated with more similar metadata 116 to each other than key values 126 that are more different. The process control device 104 uses this property of key values 126 to quickly identify metadata 116 from other network devices 102 that is similar to the metadata 116 from the network device 102 without having to compare the individual elements of the metadata 116 to each other.

At operation 206, the process control device 104 determines whether there is another key value 126 within a predetermined threshold value of the key value 126 of the metadata 116 for the network device 102. Here, the process control device 104 determines a difference between the key value 126 that was determined in operation 204 to the key values 126 in memory 110 that are associated with the metadata 116 from other network devices 102. The process control device 104 then determines whether any of the differences between the key value 126 of the network device 102 and the key values 126 of the other network devices 102 is less than or equal to a predetermined threshold value. The predetermined threshold value may be any user-defined value that corresponds with a level of similarity between metadata 116 from different network devices 102 based on their key values 126.

The process control device 104 proceeds to operation 208 in response to determining that there is a key value 126 within the predetermined threshold of the key value 126. In this case, the process control device 104 determines that the metadata 116 that is associated with another network device 102 is similar to the metadata 116 for the network device 102. This means that the metadata 116 that is associated with another network device 102 may be used to supplement the metadata 116 that is available for the network device 102 when generating a predicted system update schedule 112 for the network device 102. At operation 208, the process control device 104 identifies metadata 116 associated with an identified key value 126. In one embodiment, the process control device 104 may recover or retrieve the metadata 116 that is associated with an identified key value 126 by performing a hashing operation on the identified key value 126. In this example, the process of applying the hashing operation to the key value 126 converts the key value 126 back into its original metadata 116 format. In other examples, the process control device 104 may store associations between key values 126 and their corresponding metadata 116. In this case, the process control device 104 may use the key value 126 as a search token to identify the stored metadata 116 that is mapped to the key value 126. In other examples, the process control device 104 may use any other suitable type of process to recover or identify the metadata 116 that is associated with an identified key value 126.

Returning to operation 206, the process control device 104 proceeds to operation 210 in response to determining that the key value 126 is not within the predetermined threshold value of any other key values 126. In this case, the process control device 104 determines that there is no similar metadata 116 available from other network devices 102 that can be used to supplement the metadata 116 for the network device 102.

At operation 210, the process control device 104 generates a predicted system update schedule 112 for the network device 102 based on the metadata 116 that was obtained in operation 202 and/or operation 208. As an example, the metadata 116 may comprise timestamps that are associated with one or more system updates that were previously performed on the network device 102. The metadata 116 may also identify a system update and indicate how long the system update took to complete. In this example, the process control device 104 uses the timestamps to predict when another system update is likely to occur. For instance, the process control device 104 may determine a time period between system updates that were performed on the network device 102. The process control device 104 may then identify a time value 124 that corresponds with a future time interval for when another system update may occur based on the timestamps and the time periods between the system updates. The process control device 104 then generates a predicted system update schedule 112 for the network device 102 by storing an association between a device identifier 120 for the network device 102, a system update identifier 122 for a system update, and the determined time value 124 that corresponds with a future time interval for when another system update may occur.

As another example, the metadata 116 may comprise an execution time that is associated with one or more system updates. In this example, the process control device 104 may determine a time interval based on the execution time that is associated with one or more system updates. For instance, the process control device 104 may determine an average execution time for the system updates and use the average execution time as the time interval for a predicted system update. In this case, the process control device 104 may identify a time value 124 that corresponds with a predicted starting timestamp and a predicted ending timestamp for the determined time interval. The process control device 104 then generates a predicted system update schedule 112 for the network device 102 by storing an association between a device identifier 120 for the network device 102, a system update identifier 122 for a system update, and the determined time value 124 that corresponds with a future time interval for when another system update may occur.

In some instances, the process control device 104 may generate multiple predicted system update schedules 112 that correspond with different types of system updates that may be performed on the network device 102. In this case, the process control device 104 uses a similar process using metadata 116 that is associated with each type of system update to generate each of the predicted system update schedules 112.

At operation 212, the process control device 104 stores the predicted system update schedule 112 in memory 110. Here, the process control device 104 stores an association between an identifier for the network device 102 and the predicted system update schedule 112 in memory 110. Once the association is stored in memory 110, the process control device 104 can use the predicted system update schedule 112 the network device 102 when scheduling automated processes for the network device 102. An example of this process is described in FIG. 3. After generating and storing a predicted system update schedule 112 for a network device 102, the process control device 104 may repeat process 200 to generate a predicted system update schedule 112 for other network devices 102 in the computer system 100.

Automated Process Scheduling Process

Figure 3:
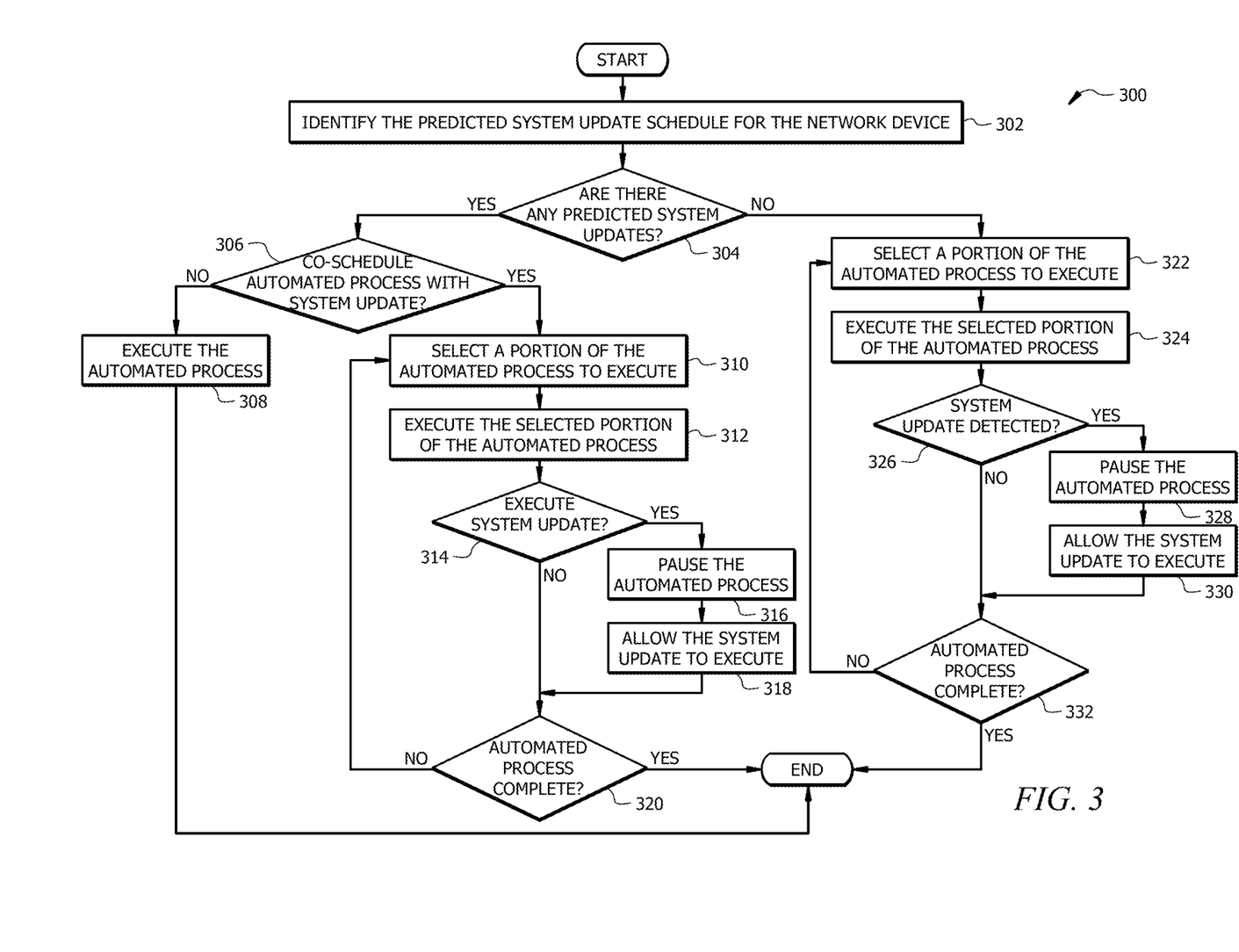
FIG. 3 is a flowchart of an embodiment of an automated process scheduling process for the computer system.

FIG. 3 is a flowchart of an embodiment of an automated process scheduling process 300. After generating a predicted system update schedule 112 for the network device 102, the computer system 100 may employ process 300 to schedule operations, such as automated processes, on the network device 102 around any predicted system updates. This process allows the computer system 100 to provide improved hardware resource management and utilization to reduce the number of tasks that are performed simultaneously on the network device 102 and thereby reduce the burden on the network device 102.

At operation 302, the process control device 104 identifies a predicted system update schedule 112 for the network device 102. In one embodiment, the process control device 104 is configured to periodically execute an automated process on a network device 102. The process control device 104 begins by first identifying automated process instructions 114 for the network device 102. The automated process instructions 114 comprise instructions for performing a series of actions on the network device 102. To schedule the automated process, the process control device 104 then identifies a predicted system update schedule 112 that is associated with the network device 102. For example, the process control device 104 may use a device identifier 120 for the network device 102 to identify a predicted system update schedule 112 from memory 110.

At operation 304, the process control device 104 determines whether there are any predicted system updates for the network device 102 based on the predicted system update schedule 112 for the network device 102. Here, the process control device 104 determines whether there are any predicted system updates for the network device 102 within a predetermined time period. For example, the process control device 104 may use the time value 124 or timestamps in the predicted system update schedule 112 to determine whether a system update is predicted to occur within a one-hour time period, a two-hour time period, a four-hour time period, a twelve-hour time period, a twenty four-hour period, or any other suitable time period. The process control device 104 proceeds to operation 306 in response to determining that there is a predicted system update for the network device 102 within the predetermined time period. In this case, the process control device 104 determines when to schedule the automated process based on the predicted system update.

At operation 306, the process control device 104 determines whether to co-schedule the automated process with the system update. Co-scheduling the automated process with the system update allows the process control device 104 to begin executing the automated process right away with the flexibility to temporarily pause the automated process while the system update is being performed. In some instances, the process control device 104 may be configured to schedule automated processes either before or after any predicted system updates. In this case, the process control device 104 will determine not to co-schedule the automated process with the system update.

The process control device 104 proceeds to operation 308 in response to determining to not co-schedule the automated process with the system update. At operation 308, the process control device 104 executes the automated process. As an example, the process control device 104 may identify a time interval when the system update is predicted to execute and then schedule the automated process to be completed before the time interval for the predicted system update. As another example, the process control device 104 may identify the time interval when the system update is predicted to execute and then schedule the automated process for a time after the time interval for the system update. The process control device 104 may execute the automated process by executing scripts, source code, macro, executable files, or any other suitable type of machine-executable code to perform a series of actions on the network device 102. In some embodiments, the process control device 104 may first establish a network connection with the network device 102 when it is time to execute the automated process. This process allows the process control device 104 to connect to the network device 102 while executing the automated process and the disconnect from the network device 102 when the automated process is complete.

Returning to operation 306, the process control device 104 proceeds to operation 310 in response to determining to co-schedule the automated process with the system update. In this case, the process control device 104 will schedule the automated process to begin executing at a time before the start time of the system update. Once the system update occurs, the process control device 104 will temporarily pause the automated process at a second time and resume the automated process at a third time when the system update has been completed.

At operation 310, the process control device 104 selects a portion of the automated process to execute. In one embodiment, the automated process is implemented using machine-executable code that is partitioned into a plurality of code segments using breakpoints. Each breakpoint corresponds with a logical breakpoint between two code segments. A breakpoint may also correspond with a location in the code where the execution of the code can be temporarily paused to allow other operations (e.g. a system update) to be performed. The process control device 104 begins by selecting a first code segment in the machine-executable code that will be executed. In subsequent iterations, the process control device 104 then selects the next code segment in the machine-executable code to execute.

At operation 312, the process control device 104 executes the selected portion of the automated process. The process control device 104 begins executing the automated process by executing the selected code segment to perform one or more actions on the network device 102. In the first iteration, the process control device 104 executes the selected code segment at a time before the system update begins. In some embodiments, the process control device 104 may first establish a network connection with the network device 102 when it is time to execute the automated process.

At operation 314, the process control device 104 determines whether to execute the system update. After executing the code segment, the process control device 104 compares the current time to the start time of the system update. The process control device 104 determines to execute the system update when the current time is past the start time of the system update or within a predetermined time period of the start time of the system update. The process control device 104 proceeds to operation 316 in response to determining to execute the system update. In this case, the process control device 104 will pause the automated process to allow the system update to execute on the network device 102.

At operation 316, the process control device 104 pauses the automated process. After executing a code segment, the process control device 104 can temporarily pause the execution of the automated process at the breakpoint that terminates the code segment. By pausing the automated process at the breakpoint, the process control device 104 can later resume the automated process by executing the next code segment after the breakpoint. This process allows the process control device 104 to safely stop the automated process at a point where the automated process can be resumed at a later time after the system update is complete. In some embodiments, the process control device 104 may temporarily store any data that is associated with the automated process in memory 110 after pausing the execution of the automated process. This process allows the process control device 104 to securely store any data that is associated with the automated process while the system update is being performed. After the system update is completed, the process control device 104 may retrieve the stored data from the memory 110 to continue performing the automated process.

At operation 318, the process control device 104 allows the system update to execute. After pausing the automated process, the process control device 104 may grant permission or allow the system update to be performed on the network device 102. The process control device 104 may monitor log files or task managers for the network device 102 to determine when the system update has been completed. After the system update has been completed, the process control device 104 may resume executing the automated process on the network device 102.

At operation 320, the process control device 104 determines whether the automated process is complete. Here, the process control device 104 determines whether there are any remaining code segments in the automated process that need to be executed. The process control device 104 determines that the automated process has not been completed in response to determining that one or more code segments have not been executed. The process control device 104 returns to operation 310 in response to determining that the automated process is not complete. In this case, the process control device 104 returns to operation 310 to identify the next code segment to execute for the automated process. Otherwise, the process control device 104 terminates process 300 in response to determining that the automated process is complete. In this case, the process control device 104 determines that the automated process has been completed and no further actions are necessary. In some embodiments, the process control device 104 may disconnect any network connections that were established to execute the automated process.

Returning to operation 304, the process control device 104 proceeds to operation 322 in response to determining there are no scheduled system updates. In this case, the process control device 104 will begin executing the automated process while monitoring the network device 102 for any expected system updates that may occur while executing the automated process. At operation 322, the process control device 104 selects a portion of the automated process to execute. The process control device 104 begins by selecting a first code segment in the machine-executable code that will be executed. In subsequent iterations, the process control device 104 then selects the next code segment in the machine-executable code to execute.

At operation 324, the process control device 104 executes the selected portion of the automated process. The process control device 104 begins executing the automated process by executing the selected code segment to perform one or more actions on the network device 102. In the first iteration, the process control device 104 executes the selected code segment before the system update begins. In some embodiments, the process control device 104 may first establish a network connection with the network device 102 when it is time to execute the automated process.

At operation 326, the process control device 104 determines whether a system update has been detected. In some embodiments, the process control device 104 may monitor log files or task managers for the network device 102 to determine whether a system update has been detected. For example, the process control device 104 may monitor a task manager on the network device 102 to look for processes or programs that are executing on the network device 102 that correspond with a system update.

In some embodiments, the process control device 104 may detect a system update using expected execution times for each code segment. In this case, each code segment is associated with an expected execution time for how long it takes for the code segment to be executed. When a system update is running in the background on the network device 102, the amount of time it takes to execute the code segment will increase. In this example, the process control device 104 monitors the execution time for each code segment while it is being executed. When the execution time exceeds a predetermined time threshold value from the expected execution time, the process control device 104 will determine that a system update is being performed on the network device 102. In other embodiments, the process control device 104 may monitor for pop-up notifications that are associated with system updates or use any other suitable technique for detecting a system update on the network device 102.

The process control device 104 proceeds to operation 328 in response to determining that a system update has been detected. In this case, the process control device 104 will pause the automated process to allow the system update to execute on the network device 102. At operation 328, the process control device 104 pauses the automated process. In response to detecting the system update, the process control device 104 can temporarily pause the execution of the automated process at the breakpoint that terminates the code segment. By pausing the automated process at the breakpoint, the process control device 104 can later resume the automated process by executing the next code segment after the breakpoint. This process allows the process control device 104 to safely stop the automated process at a point where the automated process can be resumed at a later time after the system update is complete. In some embodiments, the process control device 104 may temporarily store any data that is associated with the automated process in memory 110 after pausing the execution of the automated process.

At operation 330, the process control device 104 allows the system update to execute. After pausing the automated process, the process control device 104 may grant permission or allow the system update to be performed on the network device 102. The process control device 104 may monitor log files or task managers for the network device 102 to determine when the system update has been completed. After the system update has been completed, the process control device 104 may resume executing the automated process on the network device 102.

At operation 332, the process control device 104 determines whether the automated process is complete. Here, the process control device 104 determines whether there are any remaining code segments in the automated process that need to be executed. The process control device 104 determines that the automated process has not been completed in response to determining that one or more code segments have not been executed. The process control device 104 returns to operation 322 in response to determining that the automated process is not complete. In this case, the process control device 104 returns to operation 310 to identify the next code segment to execute for the automated process. Otherwise, the process control device 104 terminates process 300 in response to determining that the automated process is complete. In this case, the process control device 104 determines that the automated process has been completed and no further actions are necessary. In some embodiments, the process control device 104 may disconnect any network connections that were established to execute the automated process.

Hardware Configuration for the Process Control Device

Figure 4:
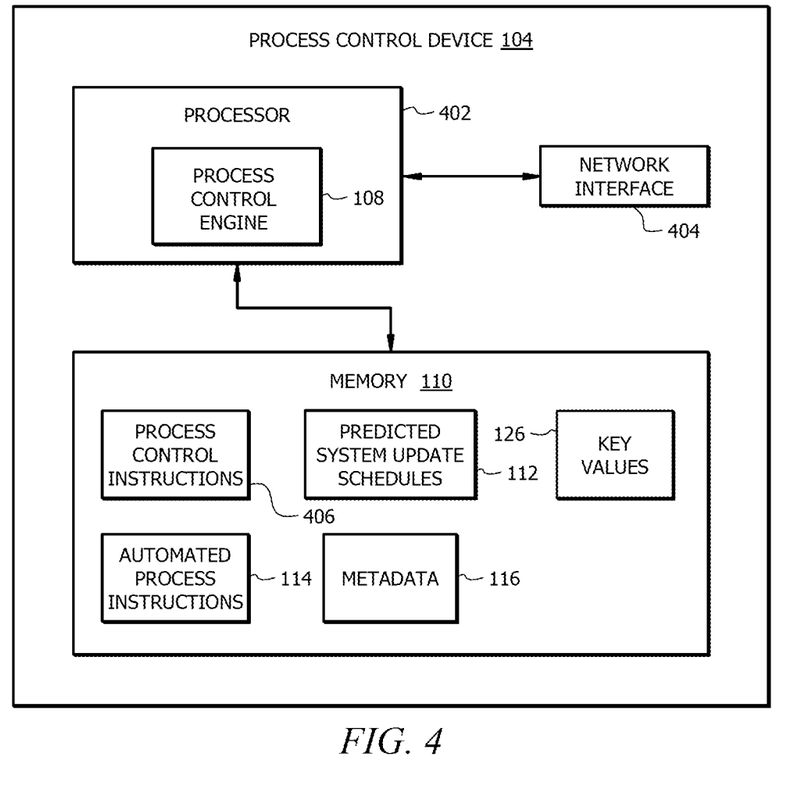
FIG. 4 is an embodiment of a process control device for the computer system.

FIG. 4 is an embodiment of a process control device 104 for the computer system 100. As an example, the process control device 104 may be a server or a computer. The process control device 104 comprises a processor 402, a memory 110, and a network interface 404. The process control device 104 may be configured as shown or in any other suitable configuration.

Processor

The processor 402 is a hardware device that comprises one or more processors operably coupled to the memory 110. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 110 and the network interface 404. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute process control instructions 406 to implement the process control engine 108. In this way, processor 402 may be a special-purpose computer designed to implement the functions disclosed herein. In an embodiment, the process control engine 108 is implemented using logic units, FPGAs, ASICs, DSPs, or any other suitable hardware. The process control engine 108 is configured to operate as described in FIGS. 1-3. For example, the process control engine 108 may be configured to perform the operations of processes 200 and 300 as described in FIGS. 2 and 3, respectively.

Memory

The memory 110 is a hardware device that is operable to store any of the information described above with respect to FIGS. 1-3 along with any other data, instructions, logic, rules, or code operable to implement the function(s) described herein when executed by the processor 402. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store process control instructions 406, predicted system update schedules 112, automated process instructions 114, metadata 116, key values 126, and/or any other data or instructions. The process control instructions 406 may comprise any suitable set of instructions, logic, rules, or code operable to execute the process control engine 108. The predicted system update schedules 112, the automated process instructions 114, the metadata 116, and the key values 126 are configured similar to the predicted system update schedule 112, automated process instructions 114, metadata 116, and key values 126 described in FIGS. 1-3, respectively.

Network Interface

The network interface 404 is a hardware device that is configured to enable wired and/or wireless communications. The network interface 404 is configured to communicate data between network devices 102 and other devices, systems, or domains. For example, the network interface 404 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A process control device, comprising:
a memory operable to store a predicted system update schedule identifying a time interval for a first system update for a network device, wherein the first system update is configured to modify one or more settings on the network device; and
a processor operably coupled to the memory, configured to:
identify automated process instructions for the network device, wherein:
the automated process instructions comprise instructions for performing a series of actions on the network device, wherein the instructions comprise:
machine-executable code partitioned into a plurality of code segments using breakpoints, wherein each breakpoint temporarily pauses execution of the machine-executable code between a pair of code segments and causes any data associated with machine-executable code to be temporarily stored in the memory;
receive a screen capture recording of one or more system updates being performed on the network device;
determine an execution time associated with the one or more system updates based on the screen capture recording;
determine the time interval for the first system update based at least in part on the execution time associated with the one or more system updates, wherein the time interval comprises a future time interval for when the first system update is predicted to occur according to the predicted system update schedule;
identify a first time instance for executing the automated process instructions that does not occur within the time interval associated with the first system update for the network device;
pause, until the first time instance, the execution of the machine-executable code using one or more of the breakpoints; and
execute the machine-executable code at the first time instance to perform the series of actions on the network device.

2. The device of claim 1, wherein the processor is further configured to:

receive metadata associated with the network device, wherein the metadata comprises timestamps associated with one or more system updates that were previously performed on the network device; and determine the time interval for the first system update based at least in part on the timestamps associated with one or more system updates that were previously performed on the network device.

3. The device of claim 1, wherein the processor is further configured to:
receive metadata associated with the network device, wherein the metadata comprises an execution time associated with one or more system updates; and
determine the time interval for the first system update based at least in part on the execution time associated with the one or more system updates from the metadata.

4. The device of claim 1, wherein executing the machine-executable code comprises establishing a network connection with the network device.

5. An automated process scheduling method, comprising:
identifying automated process instructions for a network device, wherein:
the automated process instructions comprise instructions for performing a series of actions on the network device, wherein the instructions comprise:
machine-executable code partitioned into a plurality of code segments using breakpoints, wherein each breakpoint temporarily pauses execution of the machine-executable code between a pair of code segments and causes any data associated with machine-executable code to be temporarily stored in a memory;
receiving a screen capture recording of one or more system updates being performed on the network device;
determining an execution time associated with the one or more system updates based on the screen capture recording;
determining the time interval for the first system update based at least in part on the execution time associated with the one or more system updates, wherein the time interval comprises a future time interval for when the first system update is predicted to occur according to the predicted system update schedule;
identifying a first time instance for executing the automated process instructions that does not occur within a time interval associated with a first system update for the network device;
pausing, until the first time instance, the execution of the machine-executable code using one or more of the breakpoints; and
executing the machine-executable code at the first time instance to perform the series of actions on the network device.

6. The method of claim 5, further comprising:
receiving metadata associated with the network device, wherein the metadata comprises timestamps associated with one or more system updates that were previously performed on the network device; and
determining the time interval for the first system update based at least in part on the timestamps associated with one or more system updates that were previously performed on the network device.

7. The method of claim 5, further comprising:
receiving metadata associated with the network device, wherein the metadata comprises an execution time associated with one or more system updates; and
determining the time interval for the first system update based at least in part on the execution time associated with the one or more system updates from the metadata.

8. The method of claim 5, wherein executing the machine-executable code comprises establishing a network connection with the network device.

9. A non-transitory computer-readable medium storing instructions that when executed by a processor cause the processor to:
identify automated process instructions for a network device, wherein:
the automated process instructions comprise instructions for performing a series of actions on the network device, wherein the instructions comprise:
machine-executable code partitioned into a plurality of code segments using breakpoints, wherein each breakpoint temporarily pauses execution of the machine-executable code between a pair of code segments and causes any data associated with the machine-executable code to be temporarily stored in a memory;
receive a screen capture recording of one or more system updates being performed on the network device;
determine an execution time associated with the one or more system updates based on the screen capture recording;
determine the time interval for the first system update based at least in part on the execution time associated with the one or more system updates, wherein the time interval comprises a future time interval for when the first system update is predicted to occur according to the predicted system update schedule;
identify a first time instance for executing the automated process instructions that does not occur within a time interval associated with a first system update for the network device;
pause, until the first time instance, the execution of the machine-executable code using one or more of the breakpoints; and
execute the machine-executable code at the first time instance to perform the series of actions on the network device.

10. The non-transitory computer-readable medium of claim 9, further comprising instructions that when executed by the processor causes the processor to:
receive metadata associated with the network device, wherein the metadata comprises timestamps associated with one or more system updates that were previously performed on the network device; and
determine the time interval for the first system update based at least in part on the timestamps associated with one or more system updates that were previously performed on the network device.

11. The non-transitory computer-readable medium of claim 9, further comprising instructions that when executed by the processor causes the processor to:
receive metadata associated with the network device, wherein the metadata comprises an execution time associated with one or more system updates; and
determine the time interval for the first system update based at least in part on the execution time associated with the one or more system updates from the metadata.

* * * * *